US010208827B2

(12) United States Patent
Schaffelhofer et al.

(10) Patent No.: US 10,208,827 B2
(45) Date of Patent: Feb. 19, 2019

(54) ADJUSTABLE DAMPING VALVE DEVICE WITH A DAMPING VALVE

(71) Applicant: ZF Friedrichshafen AG, Friedrichshafen (DE)

(72) Inventors: Timo Schaffelhofer, Bad Kissingen (DE); Achim Sauerbrey, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/363,027

(22) Filed: Nov. 29, 2016

(65) Prior Publication Data
US 2017/0152910 A1 Jun. 1, 2017

(30) Foreign Application Priority Data

Dec. 1, 2015 (DE) .................. 10 2015 223 932

(51) Int. Cl.
*F16F 9/46* (2006.01)
*B60G 13/08* (2006.01)
*F16F 9/342* (2006.01)
*F16F 9/348* (2006.01)
*F16K 15/02* (2006.01)

(52) U.S. Cl.
CPC ............. *F16F 9/469* (2013.01); *B60G 13/08* (2013.01); *F16F 9/342* (2013.01); *F16F 9/348* (2013.01); *F16K 15/025* (2013.01); *B60G 2202/24* (2013.01); *B60G 2500/11* (2013.01); *B60G 2800/162* (2013.01); *F16F 2228/066* (2013.01)

(58) Field of Classification Search
CPC .. F16F 9/469; F16F 9/342; F16F 9/348; F16F 2228/066; F16F 15/025; B60G 2500/11; B60G 2800/162; B60G 2202/24; B60G 13/08
USPC ............................ 188/322.13, 322.15, 282.2
See application file for complete search history.

(56) References Cited

U.S. PATENT DOCUMENTS 4,834,222 A * 5/1989 Kato .................... F16F 9/3484
188/280
6,119,831 A * 9/2000 Knecht .................... F16F 9/46
188/282.2

(Continued)

FOREIGN PATENT DOCUMENTS

EP 2677194 12/2013
EP 2679858 1/2014

*Primary Examiner* — Thomas J Williams
*Assistant Examiner* — Mariano Sy
(74) *Attorney, Agent, or Firm* — Cozen O'Connor

(57) ABSTRACT

An adjustable damping valve device with a damping valve has an elastic element, applies an axial relative force between two elements which are constructed so as to be axially movable relative to the valve housing, or the elastic element applies a relative force between an element of the damping valve, which element is constructed so as to be axially movable relative to the valve housing, and the valve housing, or the elastic element applies a relative force between an element of the damping valve, which element is constructed so as to be axially movable relative to the valve housing, and an element which is constructed so as not to be displaceable relative to the valve housing, so that one of the axially movable elements releases a flow passage for the flow of damping medium through the damping valve at least in a neutral state of the damping valve device.

18 Claims, 11 Drawing Sheets

(56) References Cited

U.S. PATENT DOCUMENTS

| | | | | |
|---|---|---|---|---|
| 6,981,577 B2* | 1/2006 | Katayama | ............... | F16F 9/465 |
| | | | | 188/267.1 |
| 8,978,844 B2* | 3/2015 | Heyn | ..................... | F16F 9/461 |
| | | | | 188/266.5 |
| 9,212,718 B2* | 12/2015 | Heyn | ........................ | F16F 9/46 |
| 9,618,138 B2* | 4/2017 | Manger | ................... | F16K 47/00 |
| 2013/0340865 A1 | 12/2013 | Manger | | |
| 2013/0341142 A1* | 12/2013 | Forster | ................... | F16F 9/464 |
| | | | | 188/322.15 |
| 2013/0341540 A1 | 12/2013 | Manger | | |
| 2014/0090733 A1* | 4/2014 | Sauerbrey | ........... | F16K 31/0655 |
| | | | | 137/613 |
| 2017/0023087 A1* | 1/2017 | Zeissner | ............... | F16F 9/3485 |

* cited by examiner

ADJUSTABLE DAMPING VALVE DEVICE WITH A DAMPING VALVE

The present invention is directed to an adjustable damping valve device with a damping valve having a flow passage at least in a neutral state and to a vibration damper with a damping valve device of this type.

BACKGROUND OF THE INVENTION

EP 2 677 194 A2 shows an adjustable damping valve device with an actuator for a vibration damper. A damping valve with a valve housing, a valve slide and a valve seat is disclosed. The valve slide is axially movably arranged in the valve housing. The valve slide rests on the valve seat element, particularly in a neutral state of the damping valve device. Therefore, the valve slide must initially be lifted from its valve seat when the damping valve device operates inside the vibration damper. The mass inertia of the valve slide which must be overcome in order for the valve slide to be lifted from the valve seat for the first time leads to an increase in damping force of the vibration damper. An increase in damping force of this kind is noticeable in the vehicle particularly in case of a soft characteristic of the vibration damper.

An object of the present invention, therefore, is to provide an adjustable damping valve device in which there is no increase in damping force of the type mentioned above.

SUMMARY OF THE INVENTION

The adjustable damping valve device preferably has a damping valve, particularly for use in a vibration damper in a motor vehicle. The damping valve device advantageously has an actuator for influencing the damping force. The damping valve comprises a valve slide, a control element and a valve seat element which are arranged at or in a valve housing. The control element is arranged axially between the valve slide and the valve seat element. The valve slide and the control element are constructed so as to be axially movable relative to the valve housing and axially movable relative to one another. For example, the valve seat element can be constructed so as to be axially fixed or axially movable to a limited extent relative to the valve housing. This is described, for example, in EP 2 679 858 A2, the disclosure of which is incorporated herein by reference in its entirety. Further, the axial movability of the control element is limited by the valve slide and the valve seat element. In addition, the axial movability of the valve slide is limited in axial direction by the valve housing and the control element. The axial movability of the valve seat element is possibly limited by the control element and the valve housing. The limits of the axial movability of the element in question depend on the position of the adjacent elements, which can change during the operation of the damping valve device. The elements can be constructed at the damping valve so as to be movable relative to the valve housing, for example, the valve slide, the control element and the valve seat element, or so as to be stationary and therefore axially immovable with respect to the valve housing, for example, the valve seat element and the valve housing itself. In addition, the valve seat element can be formed by the valve housing, but the valve seat element can also be formed of multiple parts. The valve slide can also be formed of multiple parts.

An elastic element is formed at the damping valve. This elastic element can be arranged inter alia between or at two elements of the damping valve which are constructed so as to be axially movable relative to the valve housing and axially movable relative to one another. These movable elements can be the valve slide, the control element or the valve seat element, for example. Alternatively, the elastic element can be arranged between or at a movable element of the damping valve and the valve housing. Further, the elastic element can be arranged between or at a movable element and an immovable element which is arranged so as not to be displaceable relative to the valve housing and, in particular, so as to be fixed at the valve housing. An immovable element can be formed by the valve seat element, for example. The elastic element can be compressed or tensioned without being limited to this.

The elastic element applies a relative force between the respective elements, i.e., the movable elements, the movable element and the valve housing, or the movable element and the immovable element. A flow passage through the damping valve is formed or produced by this relative force at least in a neutral state of the damping valve. In other words, the elastic element applies a force driving the elements apart from one another.

In a neutral state, the damping valve is, among other things, free from pressure differences between the various spaces in the damping valve, and a damping medium within the damping valve is advantageously stationary. This is the case, for example, when a damping valve device inside a vibration damper is stationary with respect to the damper tube. The flow passage allows damping medium to flow through the damping valve substantially without resistance.

The flow passage can be formed, for example, in that a movable element is lifted from its valve seat. Accordingly, a damping medium can flow through the flow passage freely initially to a restricted extent when the damping valve device operates. Consequently, a corresponding lifting of the valve slide is not necessary, and its mass inertia also need not be overcome and the increase in damping force mentioned above can also be avoided.

A corresponding counterforce can act opposite to the elastic element and close the flow passage. A counterforce of this kind can result, for example, from the different pressures acting on the damping valve during the operation of the damping valve device. An actuator can also close the flow passage, or keep the flow passage closed, also in a neutral state. The elastic element can be compressed in such a way that a closing of the flow passage is possible.

In particular a pre-damping valve which can be influenced inter alia by the actuator can also be arranged upstream of the damping valve. Constructions of damping valve devices of this type are disclosed, for example, in EP 2 677 194 A2 and EP 2 679 858 A2, whose contents are incorporated herein by reference in their entirety.

In a particularly advantageous construction variant, the flow passage is formed in that the valve slide or the control element is lifted from its respective valve seat.

Further, the elastic element is advantageously arranged at the valve slide and control element, at the valve slide and valve housing, or at the control element and valve housing.

This allows a simple construction because the elastic element is arranged in a simple manner between the elements which are spaced apart from one another to produce the flow passage.

The control element is advantageously arranged concentric to the valve slide and/or the valve seat element.

According to a preferred construction variant, the control element is formed as a control disk.

On the one hand, an arrangement of this kind economizes on installation space; on the other hand, it is advantageous in hydraulic respects. Further, the valve slide, the control element, the valve seat element and the elastic element can advantageously be supported against one another when the control element is constructed in a disk-shaped manner. On the one hand, the control disk forms a valve seat for the valve slide and, on the other hand, contacts the valve seat of the valve seat element.

It has turned out to be extremely advantageous to construct the elastic element as a helical spring.

A helical spring of this type is easy to produce and to accommodate in the damping valve in a space-saving manner.

In a further variant, the control disk has an orifice which cooperates with a pin formed at the valve slide.

This allows the elements to move axially relative to one another. There is also a transverse orientation of the control disk relative to the valve slide. In an advantageous manner, the pin at the valve slide and the orifice at the control disk are arranged concentrically. The transverse guidance of the axially movable component parts in a damping valve is advantageous for ensuring a defined and uniform damping action and function.

In a particularly advantageous manner, the helical spring is arranged axially between the control disk and the valve slide.

In this respect, it has proven to be particularly advantageous when the helical spring surrounds the pin.

This allows an embodiment which economizes on installation space. Further, a vibration damper for a motor vehicle is provided, which vibration damper has an adjustable damping device according to at least one of the preceding constructions or according to one of the appended claims.

BRIEF DESCRIPTION OF THE DRAWINGS

The adjustable damping valve device and the vibration damper will be described again in more detail and by way of example with reference to the accompanying figures, in which.

DETAILED DESCRIPTION OF THE PRESENTLY PREFERRED EMBODIMENTS

Figure 1:
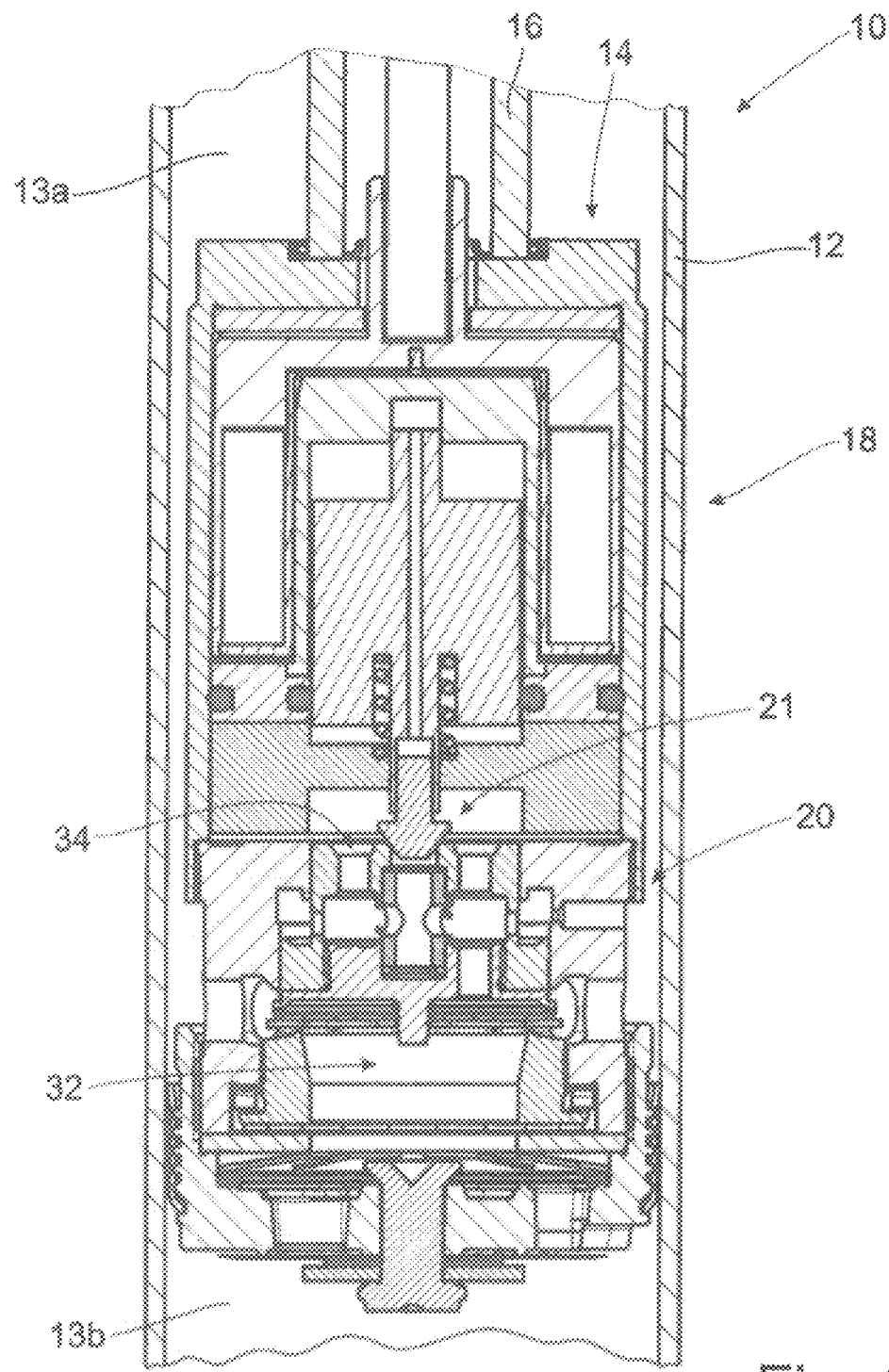
FIG. 1 is a cross-sectional view of a vibration damper with a damping valve device.
Figure 2:
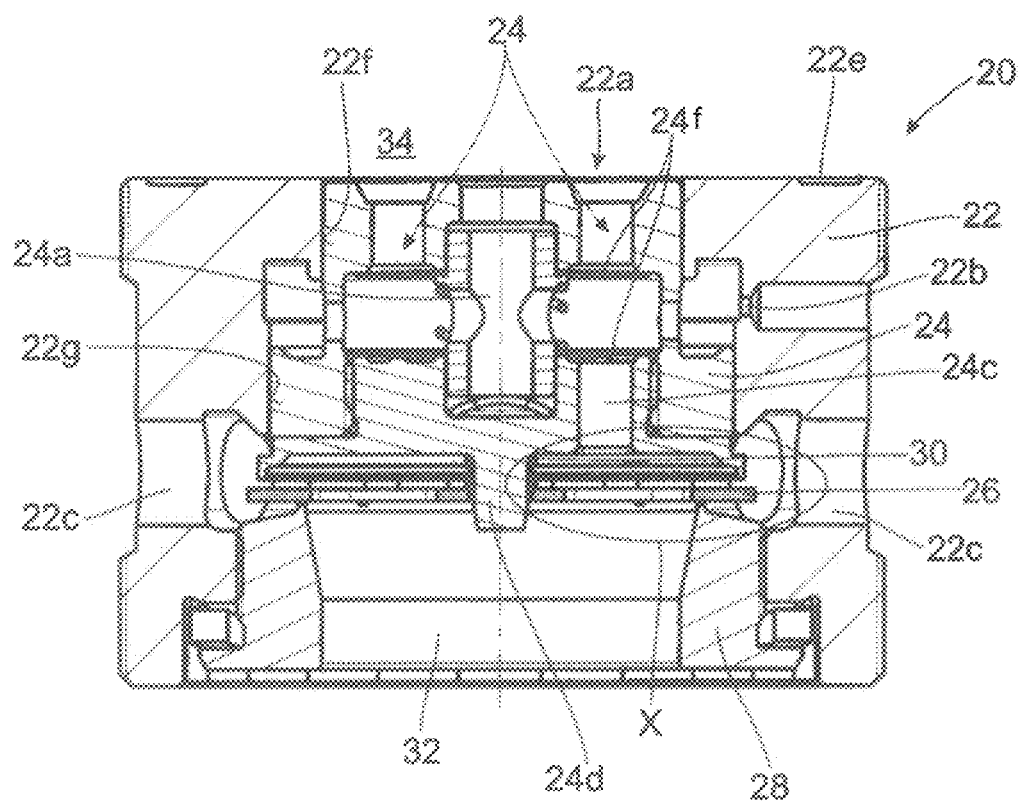
FIG. 2 is a cross-sectional view of a damping valve for an adjustable damping valve device of FIG. 1.
Figure 3:
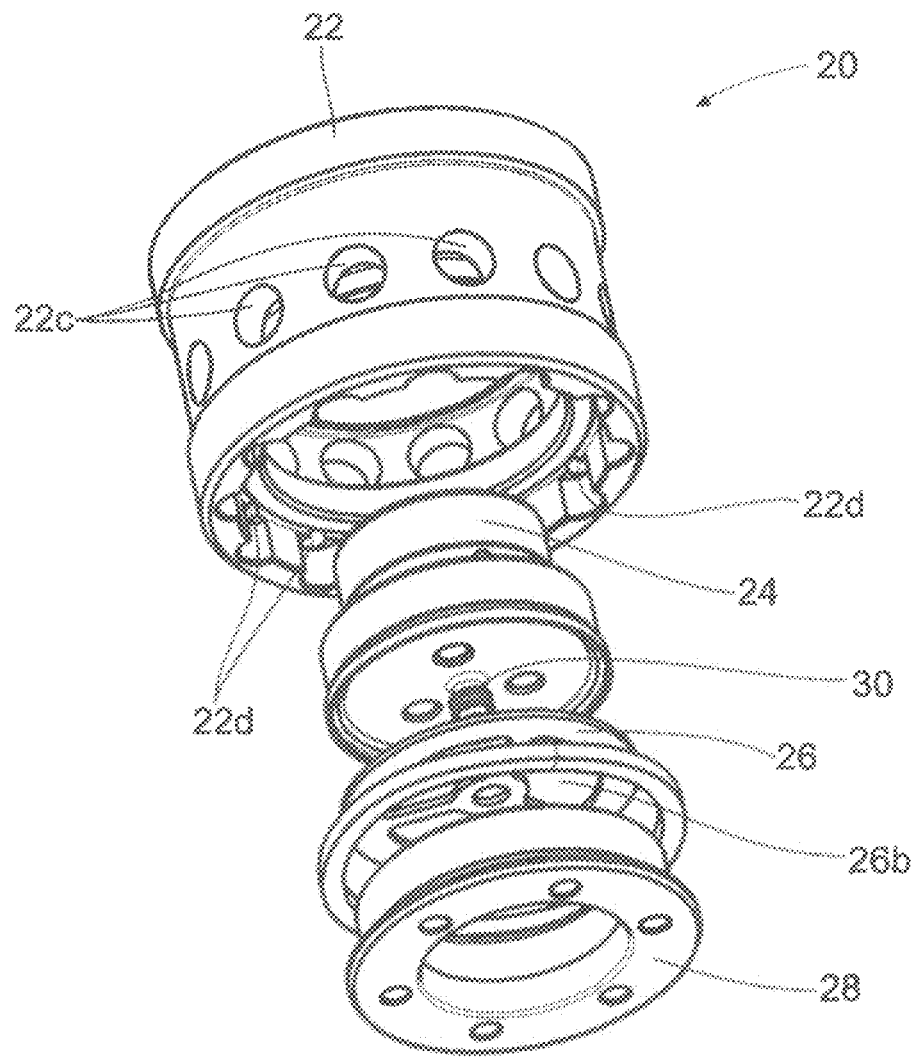
FIG. 3 is a perspective exploded view of the damping valve of FIG. 2.

FIG. 1 shows a vibration damper 10 in which a damping valve device 14 is arranged inside a damper tube 12. Damping valve device 14 is fastened to a piston rod 16. The damping valve device 14 includes an actuator 18 and a damping valve 20. The damping valve 20 is shown again individually in FIG. 2 and in FIG. 3. In addition, the damping valve device 14 divides the damper tube into an upper working space 13a and a lower working space 13b.

The valve slide element 24 is formed of multiple parts. The valve slide element 24 is likewise guided at the valve housing 22 by guide surfaces 22f and 22g formed inside the orifice 22a. The valve slide element 24 can move in an axially limited manner relative to the valve housing 22. Further, the valve slide element 24 forms a control space 24a which is operatively connected to the back chamber 34 via orifices 24b and to the front chamber 32 via orifices 24c. Further, the control space 24a is operatively connected to the upper working space 13a of the vibration damper via the choke opening 22b of the valve housing 22. Further, check valves 24f which only allow a flow from the front chamber 32 or back chamber 34 into the control space 24a are formed at the valve slide element 24. Further, it is possible for damping medium to flow from the back chamber 34 into the control space 24a via a pre-valve 21 under certain conditions. This damping valve 20 and the functioning of same is described in more detail particularly in EP 2 677 194 A2.

The control element 26 is formed as control disk 26 in this instance. The control disk 26 has a concentric orifice 26a which cooperates with a pin 24d which is likewise concentrically formed at the valve slide element 24. The control disk 26 is accordingly axially movable relative to the valve slide element, and the latter is essentially fixed in transverse direction with respect to the valve slide element 24. The movability of the valve slide element 24 is limited in axial direction on the one hand by the valve housing 22 and on the other hand by the control disk 26. With its annular portion 24e, the valve slide element 24 can abut the valve slide seat surface 26c. When the annular portion 24e makes contact with the valve slide seat surface 26c, a flow of damping medium between valve slide element 24 and control element 26 is blocked.

The valve seat element 28 is fastened to the valve housing 22, in particular it is screwed to the valve housing 20 via a thread. The valve seat element 28 could also be formed integral with the valve housing 22, for example. In doing so, the valve seat element 28 forms a valve seat 28a for the control element 26. Accordingly, the control element 26 can contact the valve seat 28a of the valve seat element 28. The control element 26 is limited with respect to its free movement in axial direction by the valve seat element 28 on the one hand and by the valve slide element 24 on the other hand. The valve seat element 28 has constant openings 28b in the form of stampings 28b at the valve seat 28a. When the control element 26 or control disk 26 is in contact, a minimum flow of damping medium from the front chamber 32 into the upper working space 13a is made possible. Further, the control disk 26 has flow passages 26b which allow a flow of damping medium through the damping valve 20 on the valve slide side and on the valve seat element side of the control disk 26.

In addition, a spring element is formed between the control disk 26 and the valve slide 24, in this case between two movable elements of the damping valve. This elastic element is formed by a helical spring 30. This helical spring 30 extends around the pin 24d on the radially outer side.

In a neutral state of the damping valve device 14 and during a soft characteristic or characteristic line of the adjustable damping valve device 14, i.e., when there is little or no axial force of the actuator 18 being exerted on the valve slide 22 in direction of the front chamber 32, the helical spring 30 exerts an axial relative force which creates a space 36 between the valve slide 24 and the control element, particularly the annular portion 24e and the valve slide seat surface 26c. This spacing 36 forms a flow passage 36. During a movement of the damping valve device 14 in compression direction, i.e., in direction of the lower working space 13b, a damping medium flows initially from the front chamber 32 via flow passage 26b of the control disk between the annular portion 24e and the valve slide surface 26c and via flow passage 22c into the upper working space 13a. In this way, particularly when there is a soft characteristic line, an increase in damping force is prevented during a start or beginning operation of the damping valve device 14 and damping valve, respectively.

Correspondingly, during an initiation of movement of the damping valve device in rebound direction, i.e., in direction of the upper working space 13a, a damping medium flows from the upper working space 13a through the flow passage 22c, between the annular portion 24e and the valve slide seat surface 26c, via the flow passage 26b of the control disk into the front chamber and, proceeding from the front chamber 32, into the lower working space 13b. Starting from a stop, the transition into a damping movement is made in compression direction and in rebound direction without an excessive increase in damping force. With increasing movement velocity in rebound direction, the control disk 26 lifts from its valve seat 28a and, owing to existing pressure conditions, contacts the annular portion 24e of the valve slide 24 with its valve slide seat surface 26c.

Accordingly, the adjustable damping valve device of the present invention includes a damping valve 20 which comprises a housing 22 and a number of damping valve elements that include a valve slide element 24, a control element 26 and a valve seat element 28. Preferably, the control element 26, is arranged between the valve slide 24 and the valve seat element 28, while the valve slide 24 is constructed so as to the axially movable relative to the valve housing 22 and the control element 26 is constructed so as to be axially movable relative to the valve housing and axially movable relative to the valve slide 24.

Figure 4:
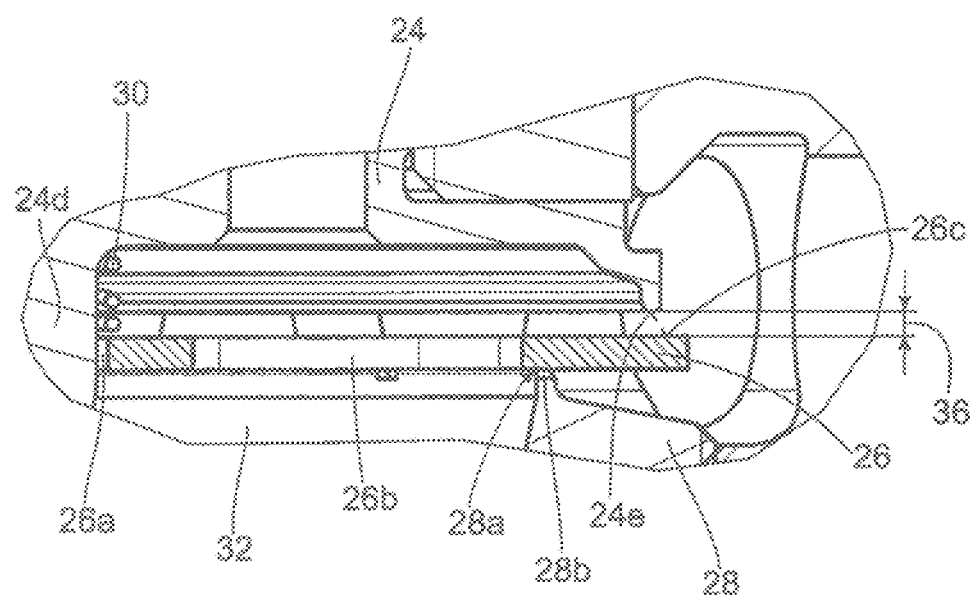
FIG. 4 is an enlarged sectional view of FIG. 2.

As discussed above and shown in FIG. 4, the damping valve 20 has an elastic element, preferably a spring 30 which is applying an axial relative force between two elements, e.g. valve slide element 24 and control element 26, of the damping valve 20 which elements are constructed so as to be axially moveable relative to the valve housing 22. Alternatively, the elastic element 30, here a disk spring, can apply an axial relative force between valve slide 24 and valve seat element 28 as shown in FIG. 5 or between control element 26 and valve seat element 28 as shown in FIGS. 6A and 6B.

Figure 7:
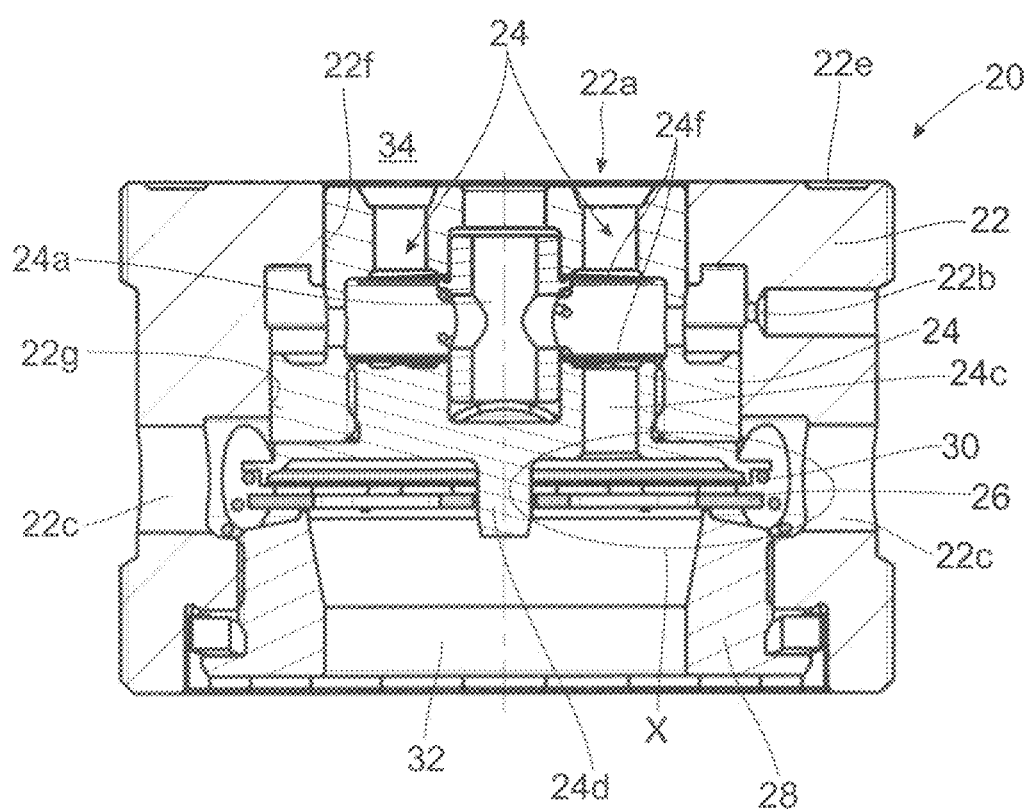
FIG. 7 is a cross-sectional view of yet another embodiment of the present invention.
Figure 8:
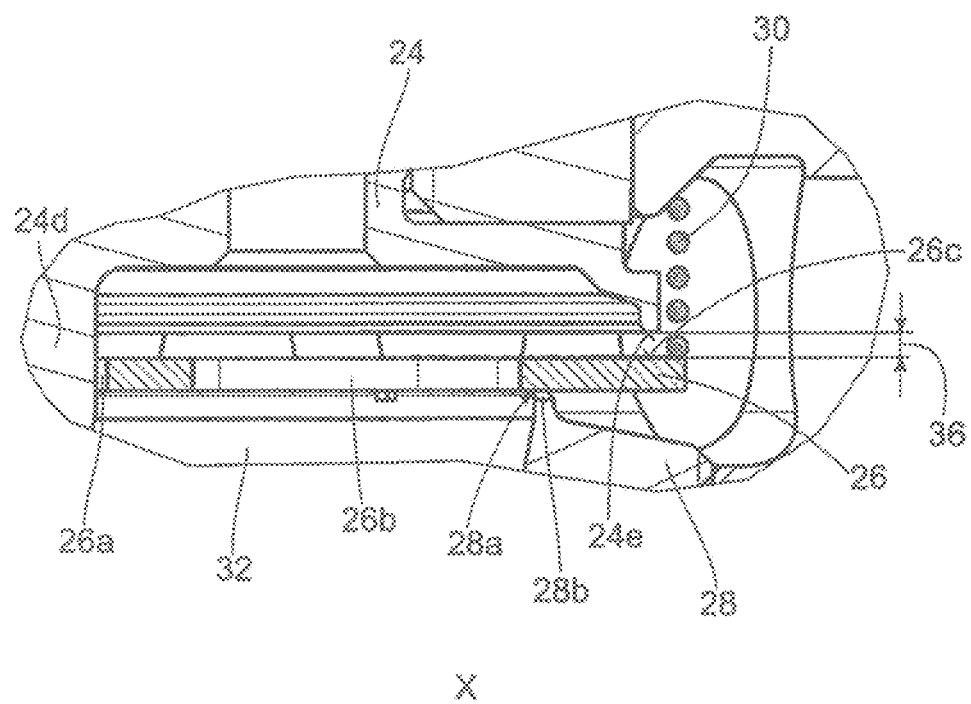
FIG. 8 is a cross-sectional view of yet another embodiment of the present invention.
Figure 9:
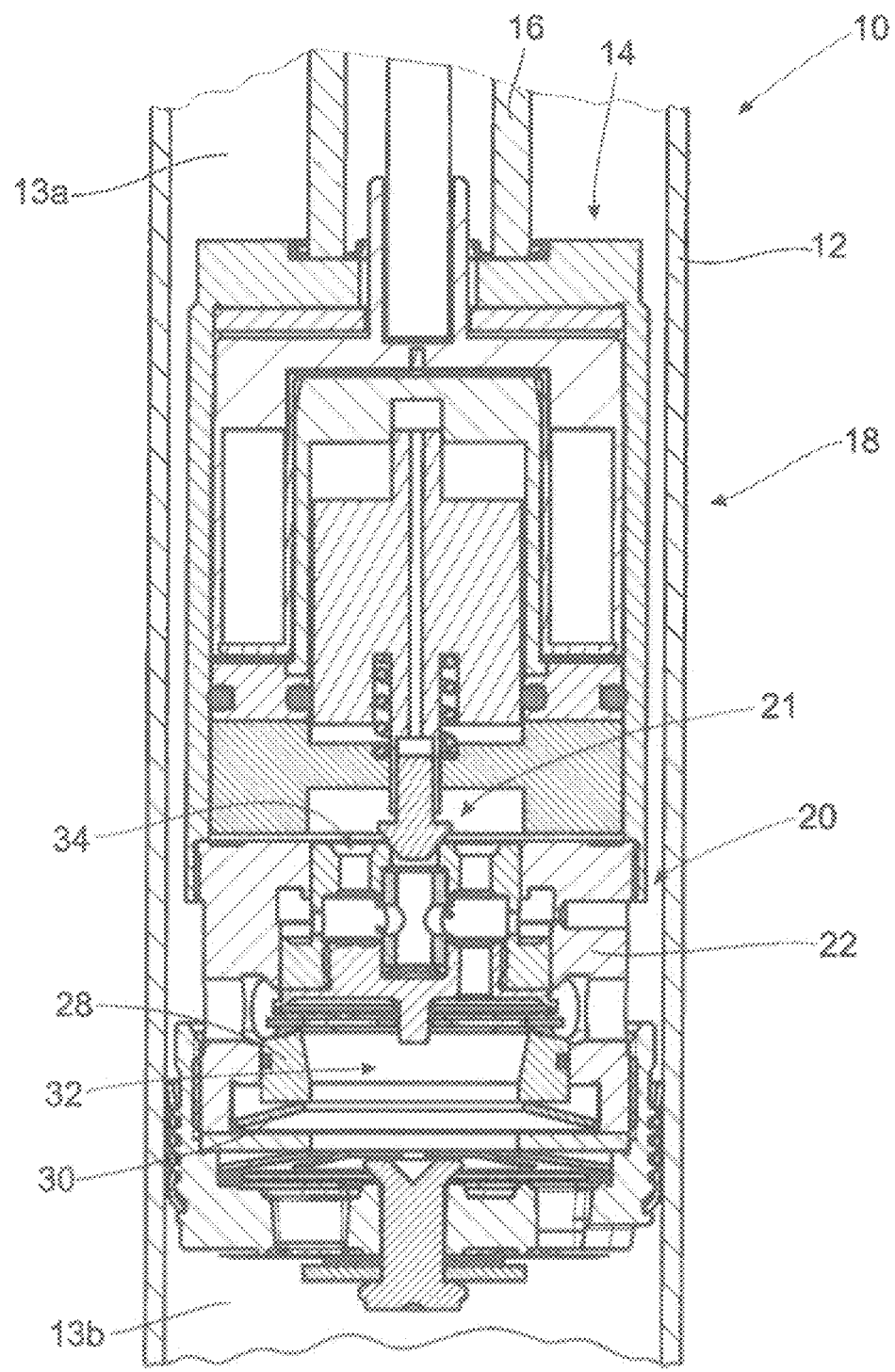
FIG. 9 is a cross-sectional view of yet another embodiment of the present invention.

In further embodiments, the elastic element 30 is applying a relative force between a damping valve element, such as valve slide 24, and the valve housing 22 as shown in FIG. 7, or between control element 26 and the valve housing 22 as shown in FIG. 8 or the valve seat element 28 and the valve housing 22 as shown in FIG. 9. In these embodiments, the respective damping valve element, i.e. the valve slide 24, the control element 26 and the valve seat element 28 is constructed so as to be axially movable relative to the valve housing 22.

Figure 5:
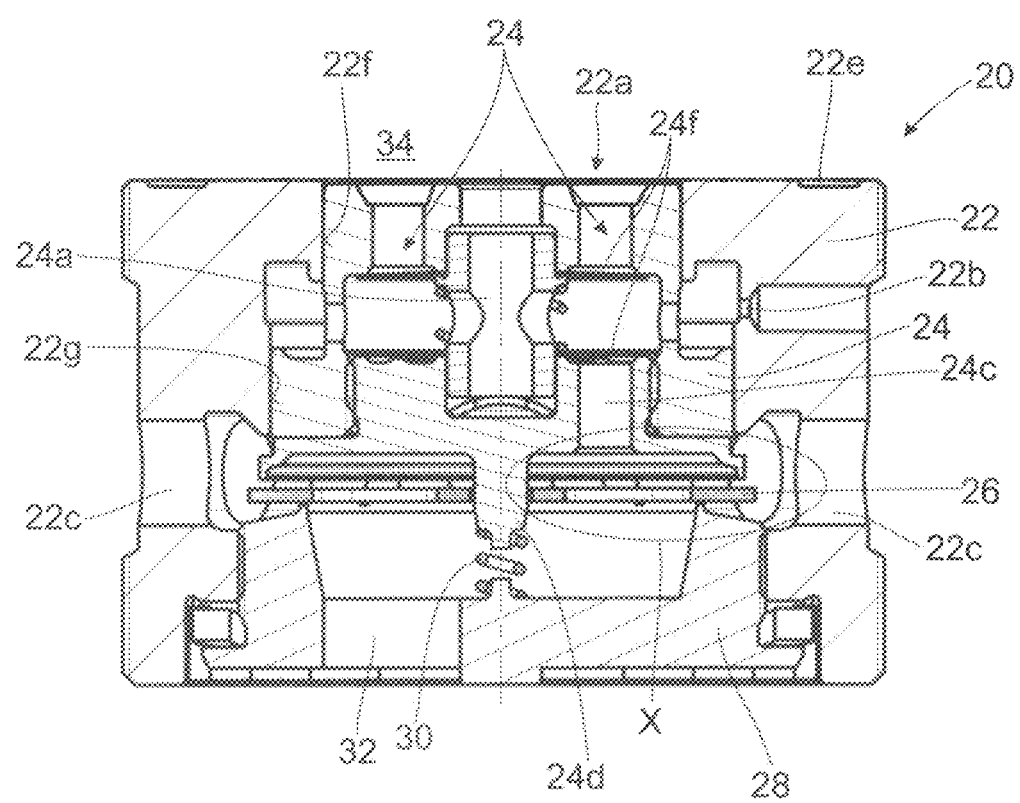
FIG. 5 is a cross-sectional view of another embodiment of the present invention.
Figure 6A:
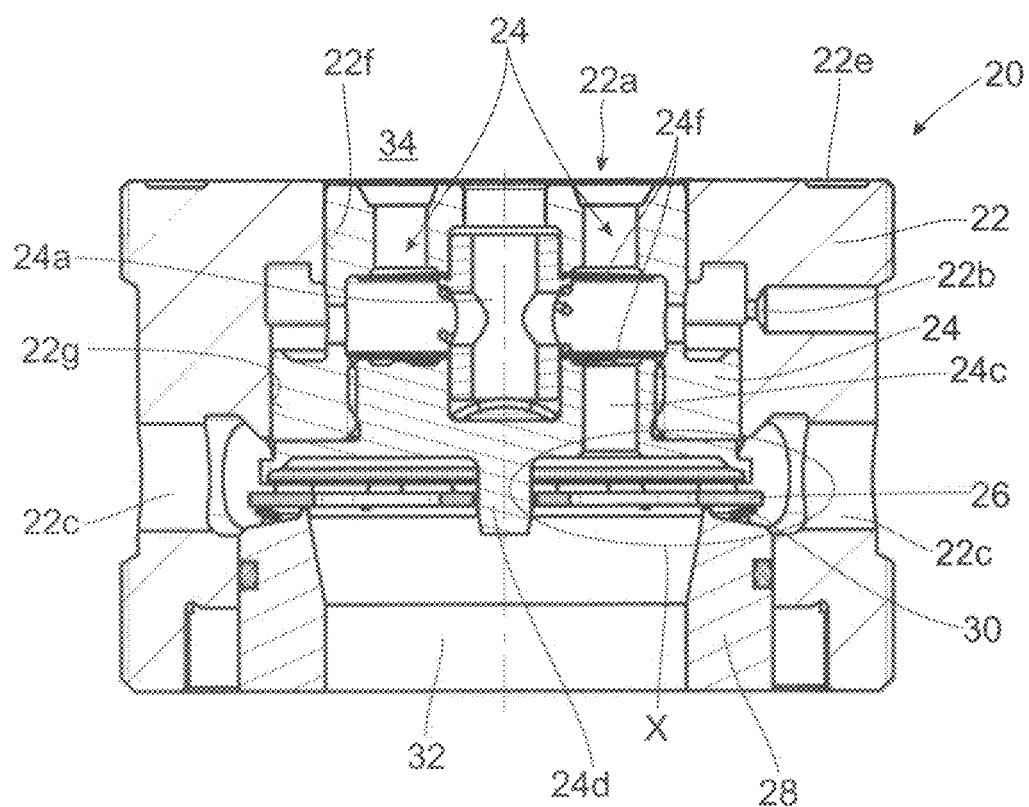
FIG. 6A is a cross-sectional view of yet another embodiment of the present invention.
Figure 6B:
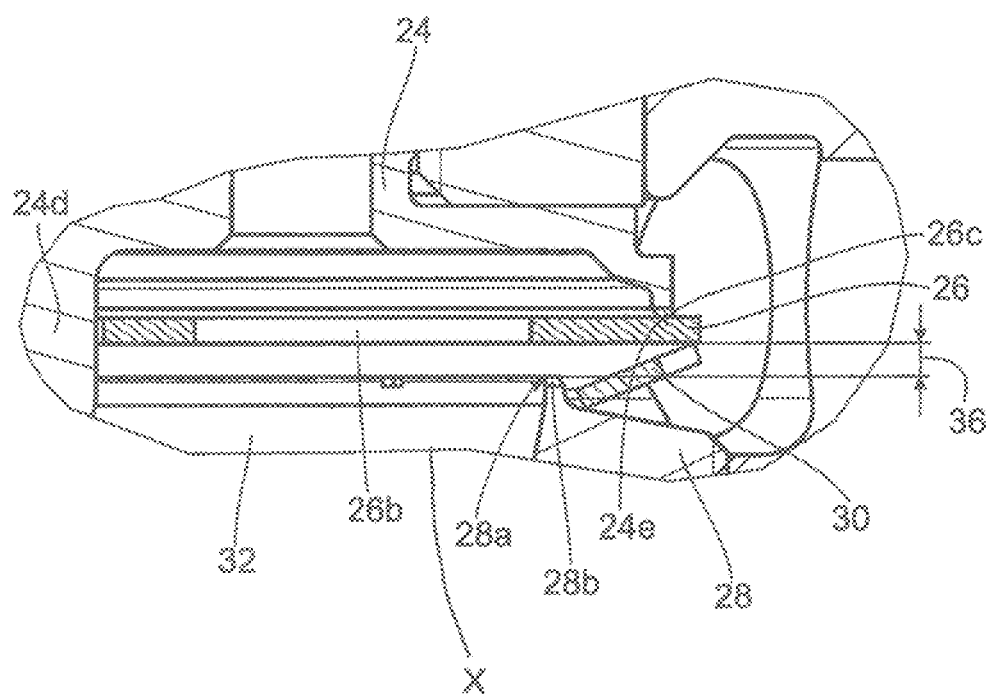
FIG. 6B is an enlarged sectional view of FIG. 6A.
Figure 10:
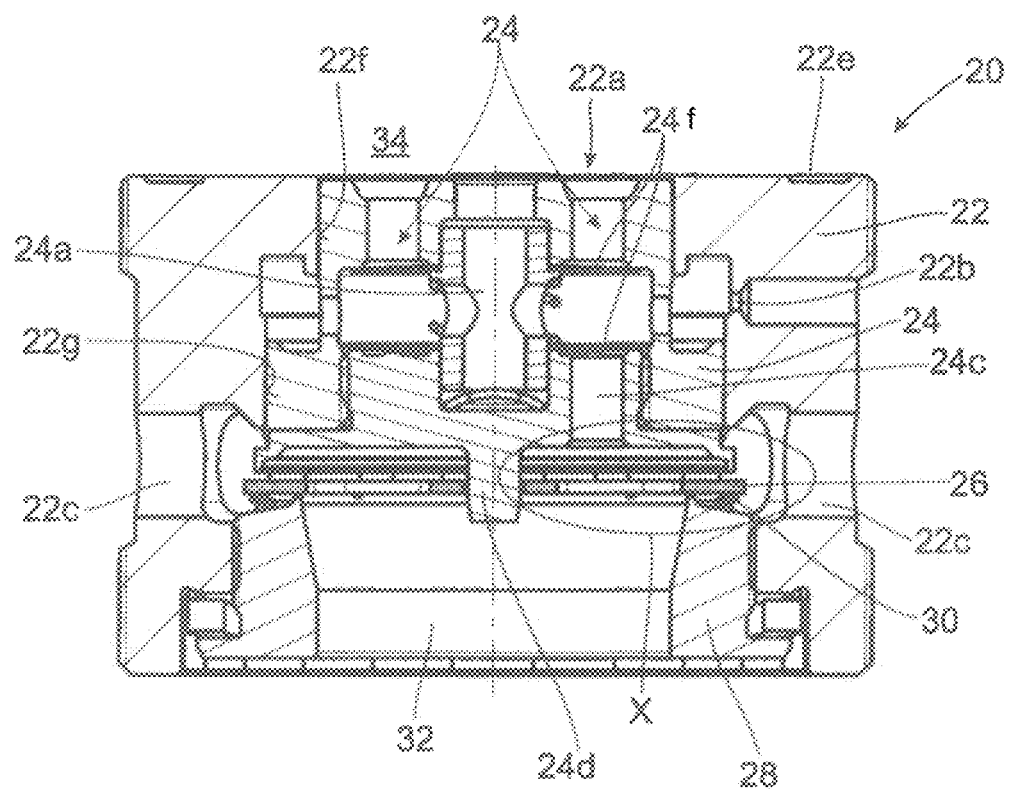
FIG. 10 is a cross-sectional view of yet another embodiment of the present invention.

In yet another embodiment, the elastic element 30 is applying a relative force between an element of the damping valve 20, such as valve slide 24 and valve seat element 28 as also shown in FIG. 5 or between control element 26 and valve seat element 28 which is constructed so as not to be displaceable relative to the valve housing 22. Again, the respective element 24, 26 of the damping valve 20 is constructed to be axially movable relative to the valve housing (FIG. 10).

In all embodiments described above, one of the axially movable damping valve elements 24, 26, 28 is forming a flow passage 36 for the flow of damping medium through the damping valve 20 at least in a neutral state of the damping valve device 14.

The helical spring 30 could also be arranged, for example, in a radially outer area of the control disk 26 and of the valve slide 24. It is also possible for the elastic element 30 to be formed axially between the control disk 26 and the valve seat element 28 so that the flow passage 36 is formed between the control disk and the valve seat element. Alternatively, the elastic element 30 could be formed between the control disk 26 and the valve housing 22 or between the valve slide 24 and the valve housing 22.

In this regard, it would also be possible to tension rather than compress the elastic element 30. For this purpose the elastic element 30 could be fastened to the control element 26 or valve slide 24 on the one hand and, on the other hand, to the valve housing 22 on the back chamber side relative to the respective element 24, 26. Consequently, the elastic element would pull the respective element 24, 26 in direction of the back chamber 34. In other words, the axial relative force of the elastic element 30 can be configured so as to attract or repel between two elements. In addition, it is possible to close the distance 36 or flow passage 36 through a sufficient axial force of the actuator on the valve slide in direction of the lower working space 13e.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE NUMERALS 10 vibration damper
12 damper tube
13a,b working space
14 damping valve device
16 piston rod
18 actuator
20 damping valve
21 pre-valve
22 valve housing
22a orifice
22b choke opening
22c flow passage
22d bypass opening
22e groove
22f,g guide surface
24 valve slide 24a control space
24b orifice
24c orifice
24d pin
24e annular portion
26 control element/control disk
26a orifice
26b flow passage
26c valve slide seat surface
28 valve seat element
28a valve seat
28b constant opening/stamping
30 elastic element/helical spring
32 front chamber
34 back chamber
36 spacing/flow passage

The invention claimed is:

1. Adjustable damping valve device (14) with a damping valve (20), the damping valve comprising a valve housing (22) and
damping valve elements comprising a valve slide element (24), a control element (26) and a valve seat element (28), wherein the control element (26) is arranged between the valve slide element (24) and the valve seat element (28);
wherein the valve slide element (24) is constructed so as to be axially movable relative to the valve housing (22); and
wherein the control element (26) is constructed so as to be axially movable relative to the valve housing (22) and axially movable relative to the valve slide element (24);
wherein the damping valve (20) comprises an elastic element (30),
the elastic element (30) is applying an axial relative force between two elements (24, 26, 28) of the damping valve (20), the two elements being constructed so as to be axially movable relative to the valve housing (22); or
the elastic element (30) is applying a relative force between an element (24, 26, 28) of the damping valve (20) and the valve housing (22), the element (24, 26, 28) being constructed so as to be axially movable relative to the valve housing (22); or
the elastic element (30) is applying a relative force between an element (24, 26) of the damping valve (20), the element (24, 26) being constructed so as to be axially movable relative to the valve housing (22), and an element (28) which is constructed so as not to be displaceable relative to the valve housing (22),
so that one of the axially movable elements (24, 26, 28) is forming a flow passage (36) for the unobstructed flow of damping medium through the damping valve (20) at least in a neutral state of the damping valve device (14) and wherein the valve slide element (24) and the control element (26) each have a valve seat (26c, 28a), and the flow passage (36) is formed in that the valve slide element (24) or the control element (26) is displaced from the respective valve seat (26c, 28a).

2. The adjustable damping valve device (14) according to claim 1, wherein the elastic element (30) is arranged at the valve slide element (24) and control element (26), or at the valve slide element (24) and valve housing (22), or at the control element (26) and valve housing (22).

3. The adjustable damping valve device (14) according to claim 2, wherein the control element (26) is arranged concentric to the valve slide (24) and/or the valve seat element (28).

4. The adjustable damping valve device (14) according to claim 2, wherein the control element (26) is formed as a control disk (26).

5. The adjustable damping valve device (14) according to claim 2, wherein the elastic element (30) is constructed as a helical spring (30).

6. A vibration damper (10) for a motor vehicle, comprising an adjustable damping device (14) according to claim 2.

7. The adjustable damping valve device (14) according to claim 1, wherein the control element (26) is arranged concentric to the valve slide element (24) and/or the valve seat element (28).

8. The adjustable damping valve device (14) according to claim 7, wherein the control element (26) is formed as a control disk (26).

9. The adjustable damping valve device (14) according to claim 1, wherein the control element (26) is formed as a control disk (26).

10. The adjustable damping valve device (14) according to claim 1, wherein the elastic element (30) is constructed as a helical spring (30).

11. The adjustable damping valve device (14) according to claim 10, wherein the helical spring (30) is arranged axially between the control element (26) and the valve slide element (24).

12. The adjustable damping valve device (14) according to claim 10, additionally comprising pin (24d) formed at the valve slide element (24); and wherein the helical spring (30) surrounds the pin (24d).

13. The adjustable damping valve device (14) according to claim 1, wherein the control element (26) has an orifice (26a) which cooperates with a pin (24d) formed at the valve slide element (24).

14. A vibration damper (10) for a motor vehicle, comprising an adjustable damping device (14) according to claim 1.

15. The adjustable damping valve device (14) according to claim 1, wherein the elastic element (30) is arranged at the valve slide element (24) and control element (26), or at the valve slide (24) and valve housing (22), or at the control element (26) and valve housing (22).

16. The adjustable damping valve device (14) according to claim 1, wherein the control element (26) is arranged concentric to the valve slide element (24) and/or the valve seat element (28).

17. The adjustable damping valve device (14) according to claim 1, wherein the control element (26) is formed as a control disk (26).

18. The adjustable damping valve device (14) according to claim 1, wherein the elastic element (30) is constructed as a helical spring (30).

* * * * *